United States Patent [19]
Spaw

[11] 3,935,970
[45] Feb. 3, 1976

[54] AUTOMATIC LEVEL MEASURING AND CONTROL SYSTEM FOR DISPENSING BIN

[76] Inventor: Robert L. Spaw, 858 E. Little York Road, Houston, Tex. 77022

[22] Filed: Feb. 4, 1974

[21] Appl. No.: 439,056

Related U.S. Application Data

[62] Division of Ser. No. 158,883, July 1, 1971, Pat. No. 3,807,231.

[52] U.S. Cl. ............... 222/56; 222/64; 340/244 C; 340/246
[51] Int. Cl.² ........................................ B67D 5/08
[58] Field of Search... 222/56, 64; 73/290 R, 304 C; 340/244 C, 246, 244 R

[56] References Cited
UNITED STATES PATENTS

| | | | |
|---|---|---|---|
| 2,381,505 | 8/1945 | Lindholm | 222/56 |
| 2,621,517 | 12/1952 | Sontheimer | 73/304 C |
| 2,674,396 | 4/1954 | Peterson | 222/56 |
| 2,774,959 | 12/1956 | Edelman | 340/244 C |
| 2,955,466 | 10/1960 | Coles | 73/304 C X |
| 3,036,736 | 5/1962 | Murphy | 222/56 X |
| 3,140,608 | 7/1964 | Clark | 73/304 C |
| 3,277,711 | 10/1966 | Roberge | 73/304 C |
| 3,404,963 | 10/1968 | Fritsche | 222/56 |

Primary Examiner—Robert B. Reeves
Assistant Examiner—David A. Scherbel
Attorney, Agent, or Firm—Torres & Berryhill

[57] ABSTRACT

A single length of insulated, stranded steel cable extends vertically through a bin or other material container and functions as a radiating antenna for an electrical signal transmitter. The reactance of the antenna, which varies as a function of the level of material in the container adjacent the antenna, is inductively linked to an oscillator circuit in the transmitter. The transmitter's signal which is altered in frequency with changes in the antenna's reactance is combined with that of a constant frequency reference signal. The frequency of the resulting difference signal is employed to form a remote indication of the material level and to provide control information for automatically maintaining or varying material levels.

15 Claims, 4 Drawing Figures

AUTOMATIC LEVEL MEASURING AND CONTROL SYSTEM FOR DISPENSING BIN

This is a division of application Ser. No. 158,883, filed July 1, 1971, now U.S. Pat. No. 3,807,231.

BACKGROUND OF THE INVENTION

1. Field of the Invention

The present invention relates to automatic means for measuring the vertical elevation of a mass of material with respect to a given reference point and for automatically controlling the supply or depletion of material within a given area to maintain a predetermined elevation in the mass.

In its presently contemplated preferred application, the invention relates to means for automatically measuring the level of grain, aggregate, fluids or other materials which are maintained within storage containers. The field of the invention also includes automatic control systems in whic material is added to or withdrawn from a container to maintain a predetermined level of material within the container.

2. Description of the Prior Art

A commonly employed technique for measuring material levels in bins includes the use of mechanically vibrated probes which extend into the bin. In such devices, the period of vibration of the probe is transduced into an electrical signal which in turn in converted into an output representation through a suitable analog transducer. Another prior art device includes a tap like probe which extends into a container holding fluid or other material. Elastic disturbances are induced in the probe and the delay time or amplitude of the reflected mechanical movement through the probe is transduced into an electrical signal to operate an analog output device which gives an indication of material depth.

Still another prior art device includes plural electrical lines which extend through the matter to be measured. The two lines function as an electrical delay line or transmission line through which electrical signals are introduced from a suitable signal source. The reflected signals in the line are timed or measured to produce an indication of the level of material within the container.

Other prior art designs include one or more probes which extend through the matter being measured and function as variable capacitors having a capacitive reactance which varies as a function of the level of the matter present in the area of the probes.

Another of the prior art systems known to the applicant herein employs a single or plural element, high frequency resonant probe which functions as an open ended resonant coaxial cavity. When the material level is sufficiently close to the probe, an oscillator circuit is loaded to terminate resonance and signal oscillation which then initiates operation of a control system.

In many of the prior art devices described herein, the probes are relatively delicate and are subject to breakage and wear. Such probes are generally not suited for use in material such as grain, aggregate and other relatively heavy abrasive solids.

Those prior art systems which employ mechanical oscillation or other physically movable probes require complex motion inducing means as well as elaborate electrical transducing and analyzing circuitry. Moreover, such systems are often unreliable and are difficult to install an maintain.

Various of the prior art systems described herein actually function exclusively as level monitors which are sensitive to only a few predetermined levels of material in a container. Such systems do not provide output represenations or displays which show a continuous variation of level within the container.

Prior art probes which require more than a single element are also undesirable to the extent that the container is cluttered with additional equipment. Capacitive probes are often objectionable in that extraneous conditions not related to the level of the matter being measured may cause false readings. In addition, a large noise-to-signal ratio is often present in systems where capacitance is the variable electrical characteristic being monitored to provide a depth reading.

SUMMARY OF THE INVENTION

The system of the present invention employs an inexpensive, single element probe of extremely high mechanical strength which can withstand the high forces exerted by moving materials such as grain, gravel and other similar products. The system monitors all material levels along the entire length of the vertically disposed probe to provide a continuous indication of level.

The antenna is inductively coupled with an oscillator circuit in a transmitter so that a change in the antenna's inductive reactance caused by a change in the level of material adjacent the probe alters the oscillator's load impedance to cause a change in the frequency of the transmitter's signal. The transmitter signal generated on the probe oscillates at a high frequency so that relatively small changes in material level produce a relatively large change in the frequency of the signal generated by the transmitter to thereby improve resolution and system accuracy. The variable frequency transmitter signal is mixed with a constant, relatively high frequency signal provided by a reference oscillator in a converter circuit. The converter circuit forms a relatively low frequency difference signal having a frequency representing the frequency difference between the reference and the transmitter signal. The difference signal is rectified and integrated to provide an input to a remotely located analog transducer which forms a visible display continuously indicating the level of material in the container.

In a modified form, the difference signal is digitized by being converted into square wave signals having pulses of constant amplitude and width and a frequency which is a function of the difference signal frequency. The digitized signal may form the input to a counter or other digital device which transduces the electrical signal to provide a visible indication of the level of the container. An analog indication may be obtained by integrating the digitized signals to form an amplitude modulated signal which is input to an analog transducer. In both the preferred and modified forms, the system may be operated as a control system by employing the difference signal to regulate operation of automatic mechanisms which maintain a predetermined level of material within the container.

In many applications, the probe may be formed of an insulated cable which is employed to carry temperature sensitive thermocouples often used in conventional grain bins to monitor grain temperature. In such applications, the control and measuring capabilities of the present invention may be realized with only minor modification of existing equipment and without the need for inserting any additional probes or other equipment into the container.

The foregoing as well as other features and advantages of the present invention may be more readily appreciated from the following specification, drawings and related claims.

DESCRIPTION OF THE PREFERRED EMBODIMENTS

Figure 1:
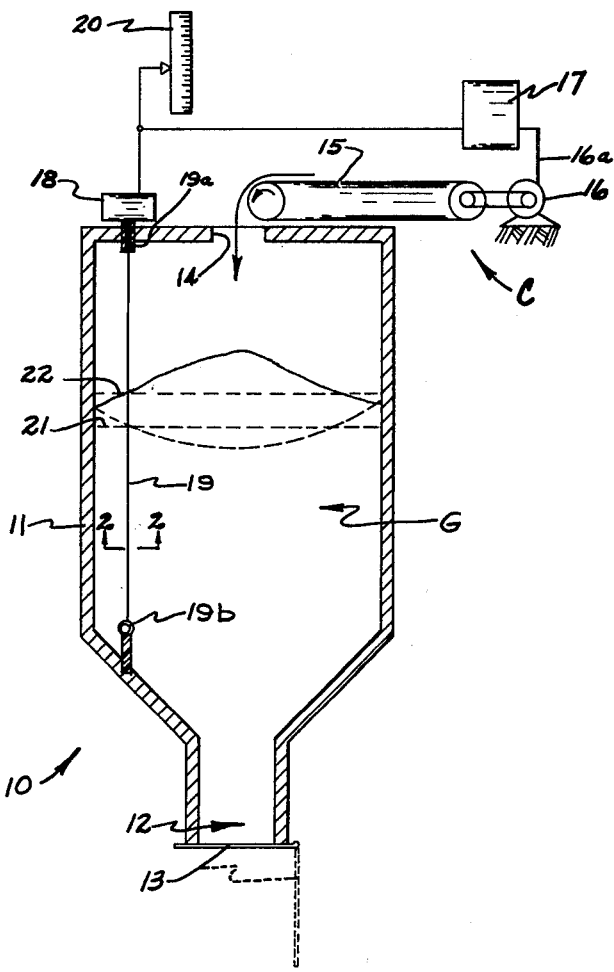
FIG. 1 is a vertical cross-sectional view illustrating a material container equipped with the automatic sensing and control system of the present invention.

In FIG. 1 of the drawings, the preferred form of the invention indicated generally at 10 includes a material storage bin 11 which is partially filled with grain G. The bin is of conventional construction having a dispensing opening 12 at its lower end which is covered by a hinged door 13. When the door 13 is moved into the dotted line position, the grain flows by gravity from the opening 12.

At the upper end of the bin, an automatic control system indicated generally at C is employed to add grain to the bin through a filling opening 14. The system C is schematically depicted and includes a conveyor belt 15 driven by an electric motor 16 which in turn is controlled through a line 16a by a motor control circuit 17. Operation of the control circuit 17 and motor 16 is dependent upon operation of a level sensor circuit 18 positioned at the top of the bin. The circuit 18 is electrically connected with a depth sensing antenna probe 19 which monitors the level of material in the bin. The antenna probe 19 is stretched vertically between insulated antenna supports 19a and 19b, connected respectively adjacent the upper and lower surfaces of the bin. The antenna is preferably spaced from the surrounding walls of the bin 11 so that the antenna may be completely surrounded with the material to be contained within the bin. The electrical output from the level sensing circuit 18 varies as a function of material level and provides inputs to the control circuit 17 and to an analog transducer indicated schematically at 20 to respectively regulate the adding of grain to the bin and to form a visible indication of the material level.

In operation, the arrangement of the invention indicated at FIG. 1 automatically provides a continuous, visible indication on the analog transducer 20 showing the level of grain within the bin 11. When the grain level falls below a predetermined minimum level indicated for example by the dotted line 21, this information is communicated from the level sensor 18 to the motor control circuit 17 to initiate operation of the conveyor belt 15 which adds grain to the bin until the grain level rises to a predetermined level indicated for example by the dotted line 22.

Figure 2:
FIG. 2 is a horizontal cross section taken along the line 2—2 of FIG. 1 illustrating details in the antenna element of the present invention.

FIG. 2 of the drawing illustrates details in the construction of the preferred form of the antenna probe 19. The antenna includes a high density polyethylene or teflon insulating sleeve employed to surround a stranded, galvanized or stainless steel cable 19d. The metal cable provides extremely high mechanical strength which resists the large forces exerted by shifting material contained within the bin and the protective insulating coating provides an abrasion resistant electrically insulating coating for the cable core.

Figure 3:
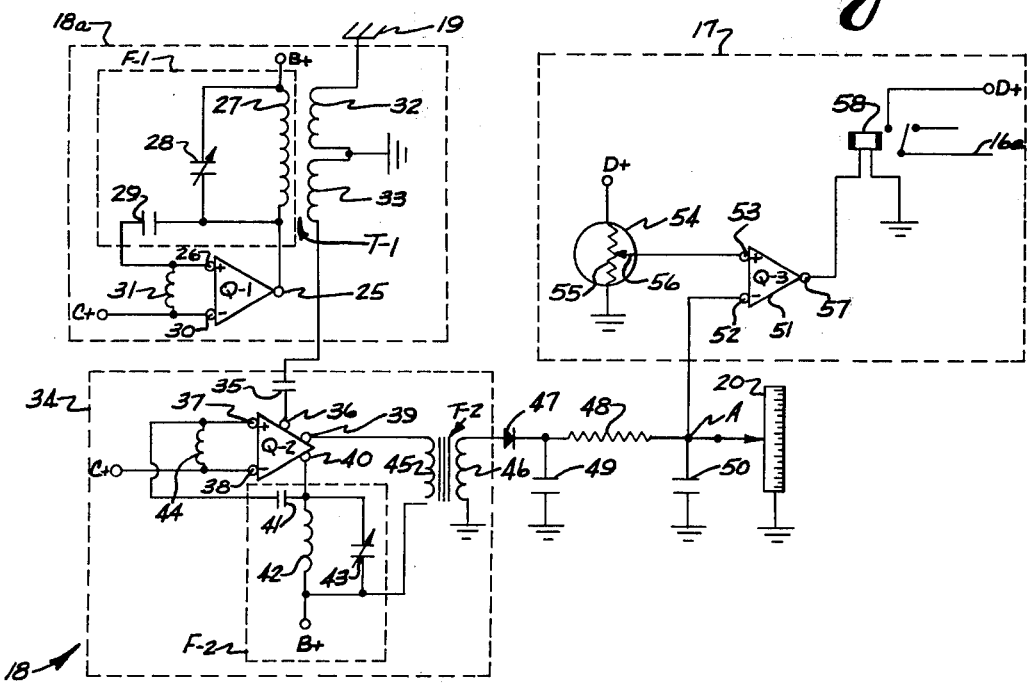
FIG. 3 is a schematic diagram of the electrical circuitry employed in the preferred form of the present invention.

As illustrated in FIG. 3, the level sensing means of the present invention includes a transmitter circuit 18a which generates a high frequency signal on the antenna probe 19. The high frequency signal is provided by an amplifier oscillator circuit formed by a differential amplifier Q-1. The amplifier forms an output signal at output 25 which is fed back to a positive input at 26 through an L-C feedback circuit F-1. The load impedance of the feedback circuit F-1 is provided in part by an inductance formed by a primary transformer winding 27 in a transformer T-1. Winding 27 is connected in parallel with a variable capacitor 28 to form an oscillator tank circuit. A direct current supply voltage B+ is connected to one end of capacitor 28 and winding 27 and the other end of each element is connected through a capacitor 29 to the positive amplifier input 26. A direct current supply voltage C+ is connected into the amplifier Q-1 through a negative input terminal 30. The supply voltage C+ establishes a quiescent operating point for the amplifier-oscillator Q-1. An A.C. blocking inductor 31 connects the supply voltage to the positive input 26 so that both amplifier inputs are provided with the same D.C. bias.

The primary winding 27 is inductively coupled with a secondary winding 32 which is connected between the antenna probe 19 and ground. A second secondary transformer winding 33 is connected at one end to ground and at its other end connects into a converter circuit 34. Because of the high frequencies involved, the inductors in the transmitter circuit 18a are preferably shielded to avoid cross talk with the rest of the system.

In operation, the reactance of the antenna probe 19 is altered by changes in the level of material adjacent the antenna element. The changes in material level affect the permativity and permeability of the spacial area into which the electromagnetic fields induced by the antenna signal are radiated. Inductive coupling exists between the antenna probe 19 and secondary winding 32 and the primary winding 27 included in the feedback circuit F-1. Because of the inductive coupling, any change in the inductive reactance of the antenna produces a change in the load impedance of the feedback circuit which in turn alters the oscillating frequency of the signal produced at amplifier output 25 and in winding 27. The new frequency of the signal is the resonant frequency established by the value of capacitor 28 and inductance 27. Secondary winding 33 is inductively coupled with winding 27 so that the frequency of the signal induced in winding 33 is the same as the frequency of the signal appearing at the output of the oscillator-amplifier Q-1.

The output signal from transmitter circuit 18a is fed through a coupling capacitor 35 into a current control node 36 in a differential amplifier depicted schematically at Q-2. Amplifier Q-2. and its associated circuitry function as an autodyne to trigonometrically sum the high frequency signal from transmitter circuit 18a with a high frequency reference signal and to convert the two signals into a single, relatively low frequency difference signal having a frequency which is a function of the transmitter signal frequency. Preferably, the difference signal has a frequency equal to the difference between the transmitter and reference signal frequencies. For this purpose, the amplifier Q-2 is equipped with positive and negative differential inputs 37 and 38, respectively, and differential outputs 39 and 40. The input 36 regulates the current through the amplifier Q-2 as a function of the frequency of the signal output from the transmitter. A highly stable reference signal is obtained by feeding the output signal from output 40 back through an L-C feedback circuit F-2 to the positive input 37. Feedback circuit F-2 includes a fixed value capacitor 41 and a parallel connected circuit including inductor 42 and variable capacitor 43 connected to a B+ supply voltage. The effective values for the inductive and capacitive components in the feedback circuit F-2 establish the frequency of the reference signal. A D.C. input bias is provided on both differential inputs from a C+ supply voltage which connects directly to the negative input 38 and connects through a blocking inductor 44 to the positive input 37. The difference signal is formed at output 39 and is input to a primary winding 45 of an iron core transformer T-2.

The difference signal formed across winding 45 is inductively coupled with a grounded secondary winding 46 of the transformer T-2 and communicated to a rectifying semi-conductor diode 47. The rectified signal transmitted through diode 47 is integrated to a smooth D.C. level by an RC circuit formed by a resistor 48 connected between two grounded capacitors 49 and 50.

The D.C. output from the integrating circuit formed at A provides the input for the analog transducer 20. The signal at A also provides the input to the motor control circuit 17 which includes a differential amplifier Q-3 employed as a comparator and relay driver. The signal at A is supplied to the negative input 52 of amplifier Q-3 which compares the signal with the constant level D.C. input appearing at the amplifier's positive input 53. The positive reference voltage provided at 53 is obtained from a voltage divider 54 provided by a resistance 55 extending between a source of D.C. power (D+) and ground. A movable tap 56 is employed to pick off a voltage between ground potential and the D+ level to provide the desired voltage level input at 53. When the signal at input 53 is more positive than that appearing at input 52, the amplifier provides an output signal at 57 which closes a relay 58 to provide electrical power from a D+ source over line 16a to the motor 16.

In adjusting the circuitry of the present invention to provide the desired measuring and control functions, the system is initially calibrated with the pin 11 empty so that no material is in contact with the antenna probe 19. Variable capacitor 28 is then adjusted until the reactance in feedback circuit F-1 causes the amplifier-oscillator circuit Q-1 to operate at a desired operating frequency. Variable capacitor 43 is then adjusted until the reference signal occurring at output 40 oscillates at the same frequency as that appearing at the output 25 of amplifier-oscillator Q-1. Under these conditions, no signal (or a D.C. level signal) is produced at the output 39 which in turn produces a zero level input to both diode 47 and analog indicator 20.

In the control circuit 17, when the bin is empty, the signal appearing at A is essentially zero so that the negative input to amplifier 51 is also zero. The voltage at input 53 is initially selected to be greater than zero so that when input 53 is more positive than input 52, an output signal is formed at 57 which causes relay 58 to close to in turn energize the system supplying grain to the bin. As the level of material in the bin continues to rise, the frequency of the difference signal at the output 39 continues to increase. When the magnitude of the filtered, integrated difference signal reaches the same value as the voltage level appearing at the positive input 53 to amplifier Q-3, the output signal from amplifier Q-3 is terminated to deenergize relay 58 which in turn stops the supply of material to the bin.

The signal generated by the transmitter 18a, may, within practical limits, have an operating frequency which is located within the range of approximately 200 KHz to 50 MHz. The preferred range of operation is between 600 KHz to 4 MHz. The frequency of the difference signal is substantially lower and would normally range from zero to 100 KHz. With regard to the construction of the circuitry illustrated in FIG. 3 of the drawings, conventional integrated circuit components are preferably employed for amplifiers Q-1, Q-2 and Q-3. However, any circuitry capable of performing the described system functions may be employed.

Figure 4:
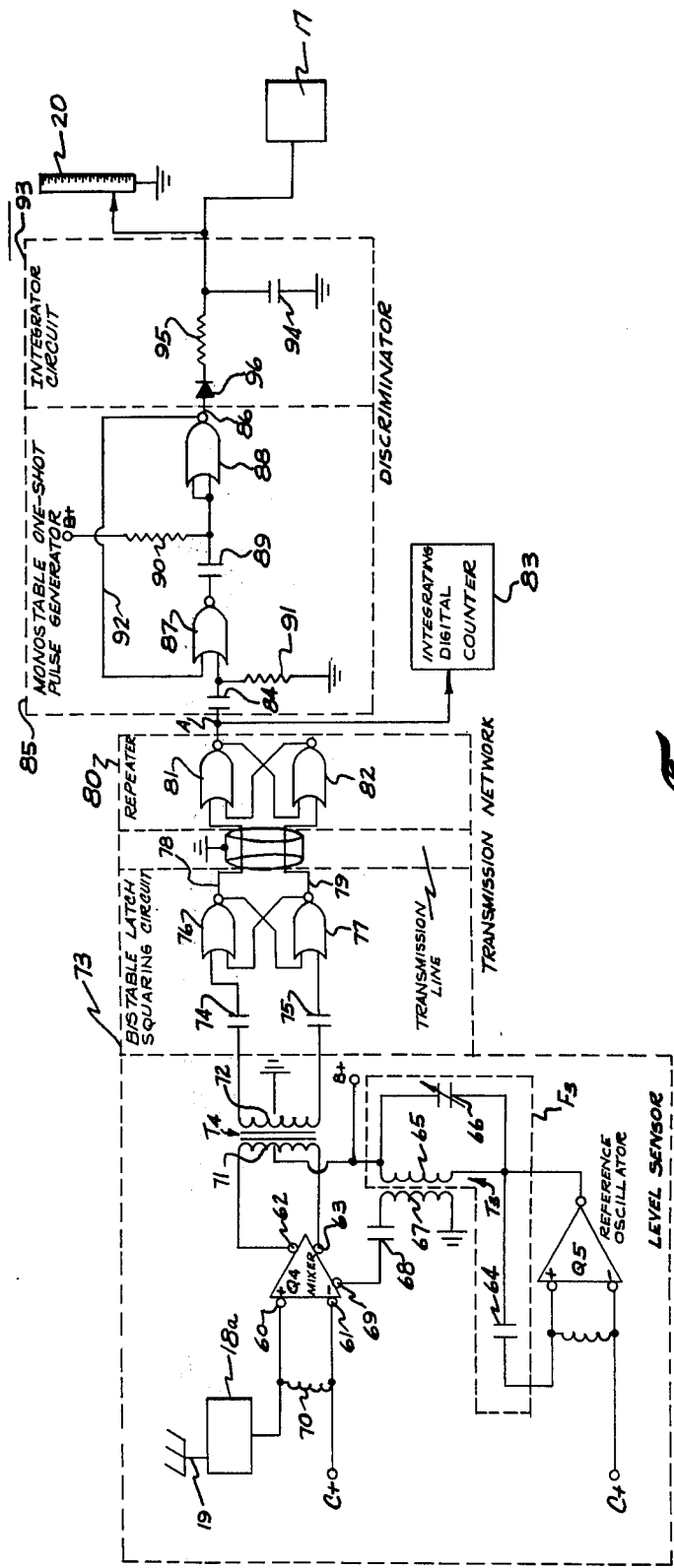
FIG. 4 illustrates a modified, digital form of the present invention.

FIG. 4 is the drawings illustrates a modified form of the present invention which includes means for increasing the stability, linearity and accuracy of the system The circuitry illustrated in FIG. 4 also includes means for converting the difference signal into square wave pulses having constant amplitude and width and a frequency which is a function of the difference signal frequency. As illustrated in FIG. 4, the signal from transmitter circuit 18a is input to the positive input of a differential amplifier Q-4 which functions as an autodyne. In general, amplifier Q-4 and its associated circuitry function in the manner previously described with reference to amplifier Q-2 in FIG. 3. In the circuitry illustrated in FIG. 4, however, increased stability is provided by employing a separate reference signal oscillator. Amplifier Q-4 includes positive and negative differential inputs 60 and 61, respectively, and differential outputs 62 and 63. The reference signal mixed with the transmitter signal is produced by an oscillator formed by a differential amplifier Q-5 employing a stable L-C feedback circuit F-3. A C+ input bias is supplied to the positive and negative inputs of amplifier Q-5 with the supply to the positive input being connected through an A.C. blocking inductor. The circuit F-3 includes capacitor 64, inductor 65 and a variable capacitor 66. Inductor 65 is the secondary of a transformer T-3 and is inductively coupled with the transformer's primary winding 67. The reference signal induced in winding 67 is transmitted through a coupling capacitor 68 to a current control input node 69 in the amplifier Q-4. The D.C. biasing voltage for the amplifier Q-4 is provided from a C+ source directly to negative input 61, and through an alternating current blocking inductor 70 to the positive input 60.

The difference signal having a frequency representing the difference between the signal appearing at input terminals 60 and 69 is formed at outputs 62 and 63 across the primary winding 71 of an iron core transformer T-4. Complementary signals in push-pull phase relationship appear across conductor winding 71 and induce a corresponding output signal across winding 72 in the secondary of transformer T-4. The difference signal is coupled with a bistable latch squaring circuit 73 through coupling capacitors 74 75. The squaring circuit includes two Nor gates 76 and 77, each of which has one of its inputs supplied by the difference signal and its second input provided by the output from the other gate to provide a bistable latch. The signal appearing at the output 78 of Nor gate 76 and the output 79 of Nor gate 77 is in the form of a square wave pulse chain exhibiting the same frequency as the difference signal appearing at the input to the latch circuit. The signal at 78 is identical to that appearing at 79 except that the two signals are 180° out of phase. By thus converting the sinusoidally varying difference signal into a square wave pulse chain, the frequency information contained in the input signal is protected from external noise that may appear further down the system.

The output signals from gate 76 and gate 77 are conveyed along lines 78 and 79, respectively, which represent a dual conductor, shielded transmission line. A repeated circuit 80 employs a second bistable latch with Nor gates 81 and 82 which reshape the signal to compensate for any attenuation or distortion caused by line impedance or disturbance. The output from gate 81 of the repeater circuit is provided at A in a digitized form comprising a square wave pulse chain having constant amplitude pulses which occur at the same frequency as the frequency of the difference signal appearing across the transformer winding 72. At this point in the circuit, pulse widths also vary with the frequency of the difference signal.

The digitized signal appearing at A may provide an input to an integrating digital counter 82. It will be appreciated that if desired, the digital signal at A may be employed for precision readout or signal interface for computer data acquisition. In the circuit of FIG. 4, the output signal appearing at A is also input through a coupling capacitor 84 to a discriminator circuit 85. The discriminator includes a monostable (one shot) multivibrator which converts the square wave signals at A to a train of pulses having equal pulse widths and equal amplitudes which appears at the pulse generator output 86. The monostable pulse generator includes two series connected Nor gates 87 and 88, series timing capacitor 89, a timing resistor 90 and an input resistor 91.

In operation, a B+ supply voltage is applied through the timing resistor 90 to two inputs of Nor gate 88. With a "high" (equivalent to a logical one) level signal at both inputs to the Nor gate, the output at 86 is "low" (equivalent to a logical zero). The low at 86 is fed back to one of the inputs of gate 87 through feedback line 92. When a high is developed across input resistor 91, which provides the second input to Nor gate 87, the output of gate 87 is pulled low which initiates a charge on timing capacitor 58 and also reverses the input level of gate 88 to provide a high at the output 86. The output at 86 remains high until sufficient current flows through timing resistor 90 to charge capacitor 89 to the cut-in voltage of the two inputs of gate 87 to ground potential (low). By this means, it may be seen that the pulse width appearing at the output of discriminator 85 is controlled by the RC time constant of timing resistor 59 and capacitor 89 and that the frequency of the output signal is a direct function of the frequency of the signal input to the discriminator.

The output signal at 86 is input to an integrator circuit 93 which forms part of the discriminator circuit. The circuit 93 integrates the area under the uniform pulses in the output pulse chain from discriminator 85 by adding charges to a charging capacitor 94 through a current limiting resistor 95 and discharging the capacitor through the analog indicator 20. A semi-conductor diode 96 connected in series between the output of the discriminator and the integrator circuit prevents reverse current flow through gate 88. The voltage input to the indicator 20 is directly proportional to the difference signal appearing across winding 72 which in turn is directly proportional to the level of material adjacent the antenna probe 19.

Although grain level in a bin has been employed to describe the operation of the present invention, it will be understood that the present invention is capable of being employed with any material having a variable dimension in any given direction. While the most common applications of the present invention anticipate vertical fluctuations of material levels adjacent the antenna probe, it will be appreciated that the probe may be disposed in any direction including a horizontal direction to measure movement of materials in the direction of its alignment. Moreover, while the automatic control functions of the present invention is described with respect to maintaining a predetermined material level, it will also be appreciated that with simple design modifications, the system may function to increase or decrease material levels at a predetermined rate or according to given function. Additionally, although the invention is described specifically with reference to material quantities or dimensional measurements, it will also be understood that the probe may be sensitive to the type or quality of material adjacent the probe rather than the level of such material. In the latter circumstance, it will be apparent that the analog indicator can provide a continuous indication of type or quality, and if desired, the control mechanism may be operated to automatically alter the type or quality of material in the sensing area to conform it to a predetermined function or value. The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A measuring system for automatically measuring a variable quality or quantity of matter present within a sensing area and for providing a representation of the value of said quality or quantity, comprising:

a. sensing means including an elongate body of metallic material having first and second end means with said body extending between spaced points in said sensing area;
   b. energizing means connected with said sensing means for electrically energizing said body;
   c. electrical processing means connected with said sensing means and responsive to a change in one or more electrical characteristics of said body which vary in value as a function of the quality or quantity of the matter adjacent said body between said spaced points and for forming an output electrical signal dependent upon the value of said one or more electrical characteristics;
   d. output means connected with said processing means and said output electrical signal for forming an output representative of the quality or quantity of the matter adjacent said body between said spaced points;

e. an enclosing structure extending about said sensing area for forming a container means, said container means including a filling opening and a dispensing opening for respectively inserting material into said container and dispensing material from said container;

f. securing means connected to said elongate body for mounting said body vertically within said enclosing structure, said securing means including first and second vertically spaced mounting members positioned substantially at the upper and lower ends of said container means with said elongate body connected to and extending linearly between said mounting members in touching engagement with matter contained within said container;

g. control means connected with and operated by said output means for automatically inserting material into said container to maintain a predetermined quantity of material said container; and h. digitizing means included in said processing means for converting said difference signal into a square wave digitized signal having pulses of constant amplitude and width and a frequency which is a function of said difference signal frequency.

2. A measuring system for automatically measuring a variable quality or quantity of matter present within a sensing area and for providing a representation of the value of said quality or quantity, comprising:

a. sensing means including an elongate body of a flexible metal cable means having first and second end means with said body extending between spaced points in said sensing area;

b. energizing means connected with said sensing means for electrically energizing said body, said energizing means including transmitting circuit means having a first oscillator circuit means for generating a variable frequency sensing signal, said elongate body being electrically coupled with said first oscillator circuit means and sensitive to the quality or quantity of matter in the area adjacent said body between said spaced points to change the load impedance of said first oscillator circuit means for causing a change in the frequency of said sensing signal;

c. electrical processing means connected with said sensing means and responsive to a change in one or more electrical characteristics of said body which vary in value as a function of the quality or quantity of the matter adjacent said body between said spaced points and for forming a first electrical signal dependent upon the value of said one or more electrical characteristics, said electrical processing means further including:

i. reference circuit means having a second oscillator circuit means for providing a substantially constant frequency reference signal;

ii. comparator means for combining said reference signal and said sensing signal to form a difference signal which is representative of the difference between said reference and sensing signals;

iii. digitizing means controlled by said difference signal for forming a square wave digitized output electrical signal having pulses occurring at a frequency which is a function of the value of said one or more electrical characteristics;

d. output means connected with said processing means and said output electrical signal for forming an output representative of the quality or quantity of the matter adjacent said body between said spaced points;

e. an enclosing structure extending about said sensing area for forming a container means, said container means including a filling opening and a dispensing opening for respectively inserting material into said container and dispensing material from said container;

f. securing means connected to said elongate body for mounting said body vertically within said enclosing structure, said securing means including first and second vertically spaced mounting members positioned substantially at the upper and lower ends of said container means with said elongate body connected to and extending linearly between said mounting members in touching engagement with matter contained within said container; and g. control means connected with and operated by said output means for automatically inserting material into said container to maintain a predetermined quantity of material within said container.

3. A measuring system as defined in claim 2 wherein said output means includes integrating circuit means for integrating said digitized signal to form an amplitude modulated signal for providing a visible output display in an analog indicator.

4. A measuring system as defined in claim 2 wherein said output means includes counting means for counting said pulses to form a visible output display in a digital indicator.

5. A measuring system for automatically measuring a variable quality or quantity of matter present within a sensing area for providing a representation of the value of said quality or quantity, comprising:

a. sensing means including an elongate body having first and second end means with said body extending between spaced points in said sensing area;

b. energizing means connected with said sensing means for electrically energizing said body, said energizing means including transmitting circuit means having a first oscillator circuit means for generating a variable frequency sensing signal, said elongate body being electrically coupled with said first oscillator circuit means and sensitive to the quality or quantity of matter in the area adjacent said body between said spaced points to change the load impedance of said first oscillator circuit for causing a change in the frequency of said sensing signal;

c. electrical processing means connected with said sensing means and responsive to a change in one or more electrical characteristics of said body which vary in value as a function of the quality or quantity of the matter adjacent said body between said spaced points and for forming an output electrical signal dependent upon the value of said one or more electrical characteristics, said electrical processing means including reference circuit means having a second oscillator circuit means for providing a substantially constant frequency reference signal and further including comparator means for combining said reference signal and said sensing signal to form a difference signal which is representative of the difference between said reference and sensing signals;

d. differential amplifier means included in said transmitting circuit means and employing a first inductive and capacitive feedback circuit to form said first oscillator circuit means, said elongate body being inductively coupled with the inductive reactance in said first feedback circuit for changing the inductive reactance in said first feedback circuit with changes in the reactance of said elongate body;

e. output means connected with said processing means and said output electrical signal for forming an output representative of the quality or quantity of the matter adjacent said body between said spaced points;

f. an enclosing structure extending about said sensing area for forming a container means, said container means including a filling opening and a dispensing opening for respectively inserting material into said container and dispensing material from said container;

g. securing means connected to said elongate body for mounting said body vertically within said enclosing structure, said securing means including first and second vertically spaced mounting members positioned substantially at the upper and lower ends of said container means with said elongate body connected to and extending linearly between said mounting members in touching engagement with matter contained within said container; and h. control means connected with an operated by said output means for automatically inserting material into said container to maintain a predetermined quantity of material within said container.

6. A measuring system as defined in claim 5 wherein said reference circuit means includes a differential amplifier employing a second inductive and capacitive feedback circuit to form said second oscillator circuit means.

7. A measuring system as defined in claim 6 wherein:
a. said output electrical signal is inductively coupled with a rectifying, integrating circuit to form a direct current output signal; and
b. said output means includes display means responsive to said output electrical signal to form a visible representation of the quality or quantity of the matter adjacent said body between said spaced points.

8. A measuring system as defined in claim 7 wherein said processing means includes digitizing means for converting said difference signal into a square wave digitized signal having pulses of constant amplitude and width and a frequency which is a function of said difference signal frequency.

9. A measuring system for automatically measuring a variable quality or quantity of matter present within a sensing area and for providing a representation of the value of said quality or quantity, comprising:
a. sensing means including an elongate body having first and second end means with said body extending between spaced points in said sensing area;
b. energizing means connected with said sensing means for electrically energizing said body, said energizing means including transmitting circuit means having a first oscillator circuit means for generating a variable frequency sensing signal, said elongate body being electrically coupled with said first oscillator circuit means and sensitive to the quality or quantity of matter in the area adjacent said body between said spaced points to change the load impedance of said first oscillator circuit for causing a change in the frequency of said sensing signal;

c. electrical processing means connected with said sensing means and responsive to a change in one or more electrical characteristics of said body which vary in value as a function of the quality or quantity of the matter adjacent said body between said spaced points and for forming an output electrical signal dependent upon the value of said one or more electrical characteristics, -aid electrical processing means further including:
 i. reference circuit means having a second oscillator circuit means for providing a substantially constant frequency reference signal;
 ii. comparator means for combining said reference signal and said sensing signal to form a difference signal which is representative of the difference betw-en said reference and sensing signals;
 iii. digitizing means for forming a square wave digitized signal having pulses o-curring at a frequency which is a function of the value of said one or more electrical characteristics;

d. output means connected with said processing means and said output electrical sigal for forming an output representative of the quality or quantity of the matter adjacent said body between said spaced points;

e. an enclosing structure extending about said sensing area for forming a container means, said container means including a filling opening and a dispensing opening for respectively inserting material into said container and dispensing material from said container;

f. securing means connected to said elongate body for mounting said body vertically within said enclosing structure, said securing means including first and second vertically spaced mounting members positioned substantially at the upper and lower ends of said container means with said elongate body connected to and extending linearly between said mounting members in touching engagement with matter contained within said container; and g. control means connected with and operated by said output means for automatically inserting material into said container to maintain a predetermined guantity of material within said container.

10. A measuring system as defined in claim 9 wherein said output means includes integrating circuit means for integrating said digitized signal to form an amplitude modulated signal for providing a visible output display in an analog indicator.

11. A measuring system as defined in claim 10 wherein said output means includes counting means for counting said pulses to form a visible output display in a digital indicator.

12. A measuring system for automatically measuring a variable quality or quantity of matter present within a sensing area and for providing a representation of the value of said quality or quantity, comprising:
a. sensing means including an elongate body of a flexible metal cable means having first and second end means with said body extending between spaced points in said sensing area;
b. energizing means connected with said sensing means for electrically energizing said body, said energizing means including transmitting circuit means having a first oscillator circuit means for generating a variable frequency sensing signal, said elongate body being electrically coupled with said first oscillator circuit means and sensitive to the quality or quantity of matter in the area adjacent said body between said spaced points to change the load impedance of said first oscillator circuit for causing a change in the frequency of said sensing signal;

c. electrical processing means connected with said sensing means and responsive to a change in one or more electrical characteristics of said body which vary in value as a function of the quality or quantity of the matter adjacent said body between said spaced points and for forming an output electrical signal dependent upon the value of said one or more electrical characteristics, said electrical processing means including reference circuit means having a second oscillator circuit means for providing a substantially constant frequency reference signal and further including comparator means for combining said reference signal and said sensing signal to form a difference signal which is representative of the difference between said reference and sensing signals;

d. differential amplifier means included in said transmitting circuit means and employing a first inductive and capacitive feedback circuit to form said first oscillator circuit means, said elongate body being inductively coupled with the inductive reactance in said first feedback circuit for changing the inductive reactance in said first feedback circuit with changes in the reactance of said elongate body;

e. output means connected with said processing means and said output electrical signal for forming an output representative of the quality or quantity of the matter adjacent said body between said spaced points;

f. an enclosing structure extending about said sensing area for forming a container means, said container means including a filling opening and a dispensing opening for respectively inserting material into said container and dispensing material from said container;

g. securing means connected to said elongate body for mounting said body vertically within said enclosing structure, said securing means including first and second vertically spaced mounting members positioned substantially at the upper and lower ends of said container means with said elongate body connected to and extending linearly between said mounting members in touching engagement with matter contained within said container; and control means connected with and operated by said output means for automatically inserting material into said container to maintain a predetermined quantity of material within said container.

13. A measuring system as defined in claim 12 wherein said reference circuit means includes a differential amplifier employing a second inductive and capacitive feedback circuit to form said second oscillator circuit means.

14. A measuring system as defined in claim 13 wherein:
a. said output electrical signal is inductively coupled with a rectifying, integrating circuit to form a direct current output signal; and
b. said output means includes display means responsive to said output electrical signal to form a visible representation of the quality or quantity of the matter adjacent said body between said spaced points.

15. A measuring system as defined in claim 14 wherein said processing means includes digitizing means for converting said difference signal into a square wave digitized signal having pulses of constant amplitude and width and a frequency which is a function of said difference signal frequency.

* * * * *